United States Patent Office 2,716,273
Patented Aug. 30, 1955

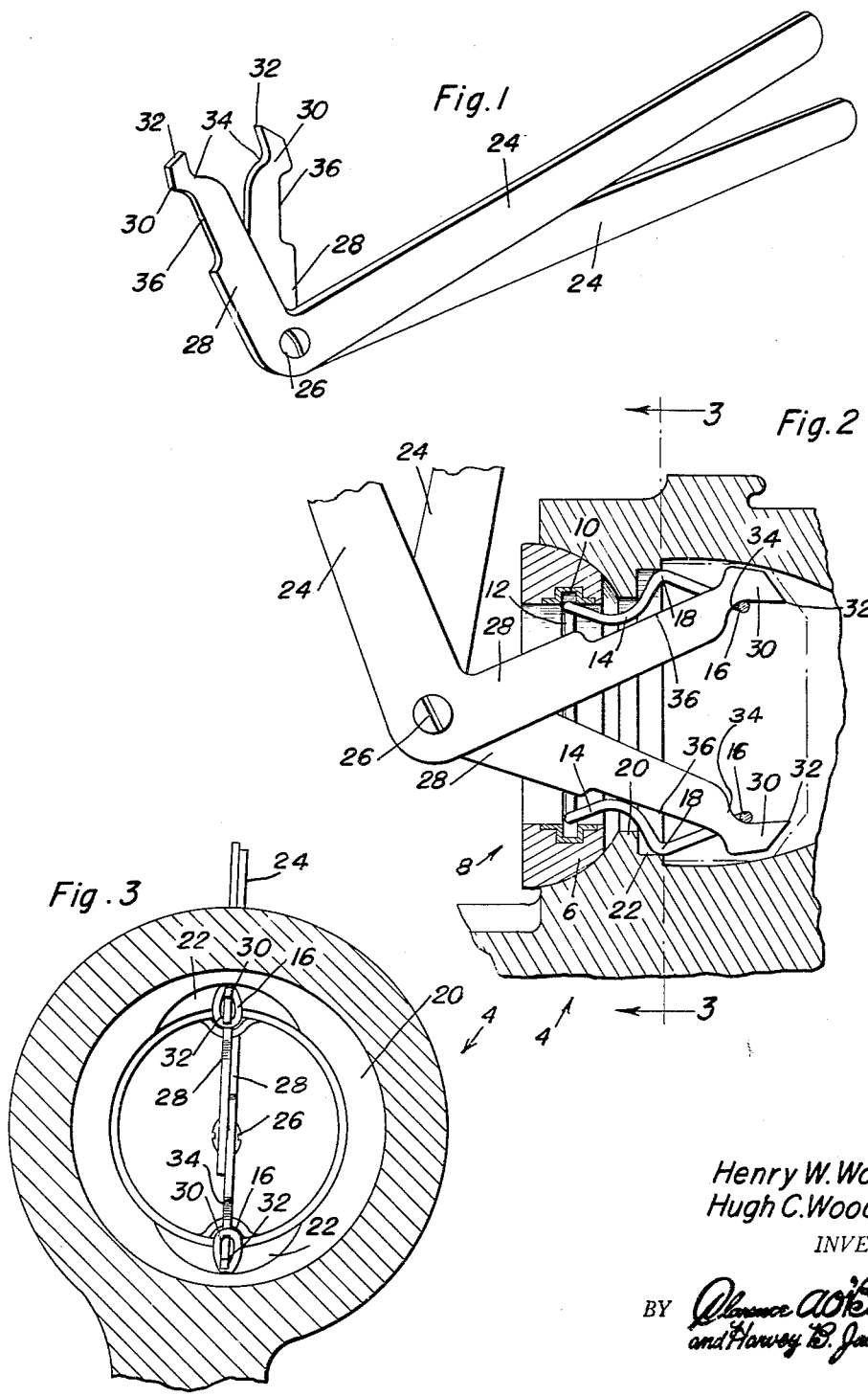

2,716,273

SPRING INSERTING PLIERS

Henry W. Woodruff and Hugh C. Woodruff, Huron, S. Dak.

Application July 30, 1954, Serial No. 446,835

1 Claim. (Cl. 29—229)

The present invention relates to a special purpose tool for manual use and which is especially designed and otherwise constructed to provide what may be described as a pair of pliers, the latter being especially useful to one in installing a steam gasket in a coupling such as is used on the end of a steam pipe, that is, where steam pipes between passenger cars are separably coupled with another.

It is a matter of common knowledge that the coupling on the end of the steam pipe is provided with a seat which accommodates an insertable and removable gasket. The gasket commonly employed is of an annular type and on the inner periphery, there is a channel-shaped holder for a resilient retainer ring. The retainer ring is provided at diametrically opposite points with a pair of resilient detents which snap into place, and the detents have shoulders to engage in keeper pockets provided therefor inwardly of a flange within the bore of the coupling. It is necessary at times to install a gasket when steam is issuing through the pipe and its coupling, and it is therefore difficult to accomplish the job without running the risk of getting burned. There has therefore existed a need for a special tool to press or squeeze the detents of the retainer ring together so as to permit the gasket to be put in position after which the detents then released and allowed to snap into their retaining positions. The purpose of the present invention is to provide a gasket installing tool, and in accomplishing this result, the preferred embodiment of the tool takes the form of a pair of pliers.

Briefly summarized, the pliers comprise a pair of preferably flat handles having laterally directed outer end portions with especially designed terminals which adapt themselves to releasably engage in the loop-like detents of the aforementioned gasket retainer.

An object of the invention is to provide a simple, practical and economical easy-to-use tool which is especially designed for the intended purposes and which is safe and ready for satisfactory use, the same avoiding the hazard of the user getting burned, and there being no danger of breaking or scarring the gasket.

Other objects, features and advantages will become more readily apparent from the following description and the accompanying sheet of illustrative drawings.

In the drawings, wherein like numerals are employed to designate like parts throughout the same:

Figure 1 is a perspective view of a pair of pliers constructed in accordance with the principles of the present invention;

Figure 2 is a view in section and elevation showing the aforementioned coupling, gasket, retainer for the gasket and the tool or pliers and the manner in which the tool is used for squeezing the detents together and safely applying the gasket; and Figure 3 is a section on the line 3—3 of Figure 2, looking in the direction of the arrows.

Reference is had first to Figure 2 wherein the numeral 4 designates a rigid metal or equivalent coupling of a conventional type which is used on one end of one steam pipe on passenger train service. This is, of course, no part of the invention, but is shown here in order to illustrate the merits and usefulness of the improved tool. To this end, it will be seen that the coupling has a seat 6 for the endless opposition gasket 8. On its inner periphery, the gasket is provided with an endless metal or equivalent channel 10 and this serves to accommodate the expansible and contractable ring portion 12 of the gasket retainer. The retainer also includes a pair of diametrically opposite extensions or bends 14 and these terminate in loop-like portions 16 which are obliquely inclined toward each other. These loop-like portions also provide bends 18 which constitute the actual detent. There is also an endless flange 20 on the interior of the coupling, and this is provided with diametrically opposite notches 22—22 which serve as keeper seats for the detents 18.

The improved tool for compressing or squeezing the loop-like portions 16 toward each other, and therefore, positioning the shoulders or bends 18—18 properly for unobstructed insertion comprises, as before stated, a pair of flat linearly straight levers or handles 24—24. These are overlapped and pivoted together as at 26. The laterally directed end portions 28—28 serve to offset the handles at right angles to the axis of the coupling, as shown in Figure 2, to avoid burning of one's hands during the installation step. The terminal portions of the laterally bent ends are fashioned into offset hook-like heads 30—30 which are, in turn, provided with piloting points 32—32 which guide themselves into the loops 16—16 in an obvious manner. The seat portions 34—34 adapt themselves to the bight portions of the loops 16 and thus hold the heads 30—30 satisfactorily in place. The relieved edge portions actually constitute clearance notches, and these are denoted by the numerals 36—36. They serve to accommodate the aforementioned bends 14—14 so that the end portions 28—28 will not collide with the stated bends 14—14.

In using the tool, the pointed ends 32 are passed through the openings in the loops 16 and the heads 30 are projected so that the seat portions 34—34 engage the bight portions of the loops. This serves to releasably engage the heads with the loops. By squeezing the levers 24 together, it is obvious that the detents 18—18 and complemental loops 16—16 will be squeezed together, and hence, the gasket is momentarily connected with the tool and the tool is used to insert the gasket and position it in the manner evident from the illustration in Figure 2.

It is obvious, of course, that a tool of this construction may also be used for squeezing the detents together and assisting in removing the gasket in case it gets stuck and cannot be pried loose with a screwdriver or similar instrument, as is commonly employed by railroad men.

It will be seen, therefore, that the invention has to do with a simple, economical and practical pair of special purpose pliers wherein the handles are aptly offset so that the hands are not in danger of getting burned, and so that there is also no danger of breaking or scarring the gasket which, as is obvious, is very important in inserting gaskets. With these pliers, the gasket is safely held and slipped into place without any trouble.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

For use in handily and safely installing a steam gasket in a passenger train steam pipe coupling wherein said gasket is provided with a retainer spring having diametrically opposite oblique-angled resilient loop-like detents; manually actuable pliers comprising a pair of pivotally connected handles provided at their pivoted ends with laterally directed end portions, the latter having terminals structurally designed to extend through the slot portions of said detents in a manner to engage the bight portions of the respective detents and to thus permit the user to forcibly squeeze and press the detents toward each other so as to clear an existing keeper flange on the stated coupling, whereupon when the detents are intentionally released and thus relieved of pressure, they snap into retentive engagement with said flange, said laterally directed end portions being rectangular in cross-section and flat-faced, said terminals being fashioned into offset heads and said heads having pointed ends to pilot and guide themselves through the stated slots and into engaging relation with the bight portions of the respective detents, said heads being likewise flat-faced and of relatively thin rectangular cross-section and such that they accommodate and adapt themselves to the restricted slot existing between the limbs of the loop-shaped detents, said laterally directed end portions being rigid, single ply and of the same cross-section from end to end, the respective outer longitudinal edge portions thereof being cut away to provide clearance notches, said clearance notches being situated inwardly of the stated offset heads.

References Cited in the file of this patent

UNITED STATES PATENTS

| | | |
|---|---|---|
| 1,219,857 | Parkhurst | Mar. 20, 1917 |
| 1,792,837 | Harrison | Feb. 17, 1931 |
| 2,175,626 | Butler | Oct. 10, 1939 |
| 2,483,380 | Duffy | Sept. 27, 1949 |
| 2,483,383 | Heimann et al. | Sept. 27, 1949 |
| 2,573,942 | Wolfson et al. | Nov. 6, 1951 |

FOREIGN PATENTS

| | | |
|---|---|---|
| 123,664 | Great Britain | Mar. 6, 1919 |